United States Patent [19]

Takebayashi

[11] Patent Number: 4,752,875
[45] Date of Patent: Jun. 21, 1988

[54] ELECTRONIC CASH REGISTER WITH A SPECIALIZED DATA CAPTURING FUNCTION

[75] Inventor: Hajime Takebayashi, Kyoto, Japan

[73] Assignee: Omron Tateisi Electronics Co., Kyoto, Japan

[21] Appl. No.: 748,588

[22] Filed: Jun. 25, 1985

[30] Foreign Application Priority Data

Jun. 25, 1984 [JP] Japan .................. 59-131445

[51] Int. Cl.⁴ .................. G07G 1/12; G06F 15/21; G06F 7/28
[52] U.S. Cl. .................. 364/405; 364/900
[58] Field of Search ........ 364/405, 404, 200 MS File, 364/900 MS File

[56] References Cited

U.S. PATENT DOCUMENTS

| | | | |
|---|---|---|---|
| 3,898,622 | 8/1975 | Maynard et al. | 364/900 |
| 4,031,518 | 6/1977 | Holloron et al. | 364/900 |
| 4,085,446 | 4/1978 | Nagamura | 364/900 |
| 4,213,179 | 7/1980 | Hamano et al. | 364/405 |
| 4,594,664 | 6/1986 | Hashimoto | 364/900 X |

Primary Examiner—Jerry Smith
Assistant Examiner—Charles B. Meyer
Attorney, Agent, or Firm—Foley & Lardner, Schwartz, Jeffery, Schwaab, Mack, Blumenthal & Evans

[57] ABSTRACT

An electronic cash register according to the present invention stores price data on commodities inputted through ten keys (12) and department codes inputted through department keys (13) in a buffer (631) of a RAM (6) and thereafter store the data stored in the buffer (631) of the RAM (6) in a floppy disc (7) and transfer the same to a host computer (8) when a customer requests transaction processing through a credit card and an A key (143) or a B key (144) is operated. Therefore, the transaction data can be stored in external storages only when the A key (143) or B key (144) is operated.

8 Claims, 4 Drawing Sheets

| FUNCTION CODE | FUNCTION NUMBER |
|---|---|
| | |
| | |
| | |
| | |

| FLAG | FUNCTION CODE |
|---|---|
| DEPARTMENT CODE | TOTAL AMOUNT |
| CLASS CODE | |
| PLU CODE | |
| | |
| | |

ELECTRONIC CASH REGISTER WITH A SPECIALIZED DATA CAPTURING FUNCTION

BACKGROUND OF THE INVENTION

1. Field of the Invention

The present invention relates to an electronic cash register (hereinafter referred to as ECR). More specifically, it relates to an ECR having the so-called capturing function of registering contents of transactions made through credit cards and through a price look-up function in external storages such as a floppy disc and a host computer.

2. Description of the Prior Art

With the spread of credit cards, added to recent ECRs are functions for performing transaction processing employing the credit cards. Some types of ECRs have the so-called price look-up function (PLU) for presetting data on prices of commodities in memories and simply inputting department codes thereby to read the price data corresponding to the department codes and register the same. Such ECRs include those having the capturing function and those having no capturing function.

In an ECR having the capturing function, data on credit transactions and those registered through the price look-up function are stored in external storages such as a floppy disc and a host computer, to be effectively used later on. Such capturing function can be set by a program. Therefore, the transaction data can be captured without condition if the capturing function is programmed, whereas no such capturing operation is performed if the capturing function is not programmed.

There is a requirement in some shops for capturing data on transaction processing performed only through certain types of credit cards. However, in the conventional ECR as hereinabove described, all of the transaction data are stored in the floppy disc and host computer in the case where the capturing function is programmed thereby wasting storage space, while even the minimum required transaction data cannot be captured in the case where no capturing function is programmed.

SUMMARY OF THE INVENTION

Accordingly, a principal object of the present invention is to provide an ECR which can arbitrarily register transaction data in external storages such as a floppy disc and a host computer as needed.

Briefly stated, the present invention provides an ECR which stores data on commodities purchased by a customer inputted through an input means in a storage means to calculate the total of the stored data on the commodities in response to a total calculation command, thereby to register the stored data on the commodities in external storages when a storage command is received.

Therefore, according to the present invention, the storage command is supplied only when it is necessary to store the inputted transaction data in the external storages, and hence only transaction data as instructed can be registered in the external storages.

The above and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
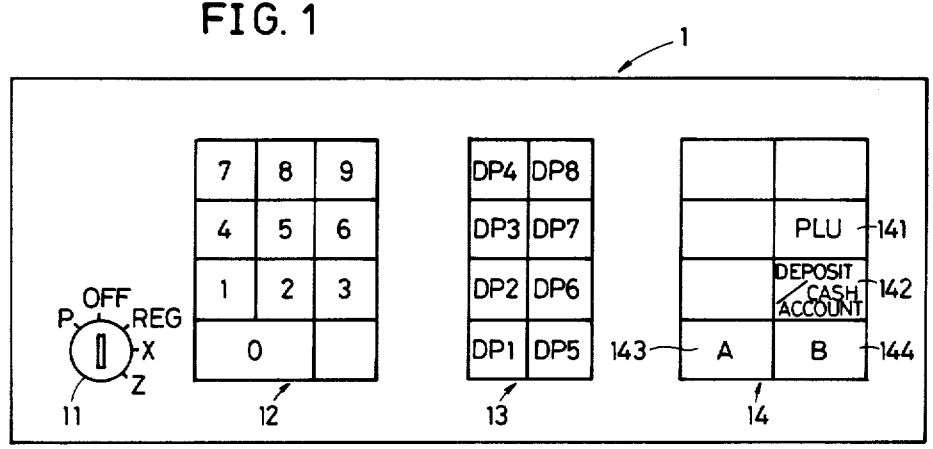
FIG. 1 is a layout diagram showing a keyboard included in an embodiment of the present invention.

FIG. 1 is a layout diagram showing a keyboard 1 included in an embodiment of the present invention. Arrangement of the keyboard 1 is now described with reference to FIG. 1. The keyboard 1 includes a mode selection switch 11, ten keys 12, department keys 13 and calculation keys 14. The mode selection switch 11 is adapted to set one of a preset mode (P), a power off mode (OFF), a registration mode (REG), an inspection mode (X) and an adjustment mode (Z). The ten keys 12 are adapted to input data on prices of commodities etc. and the department keys 13 are adapted to input department codes. The calculation keys 14 include a PLU key 141, a deposit/cash account key 142, an A key 143 and a B key 144. The PLU key 141 is operated for registering data on the commodities by the so-called price look-up function. The deposit/cash account key 142 is operated to make transactions in cash. The A key 143 and B key 144 are operated to capture data on transactions processed by A and B types of credit cards.

Figure 2:
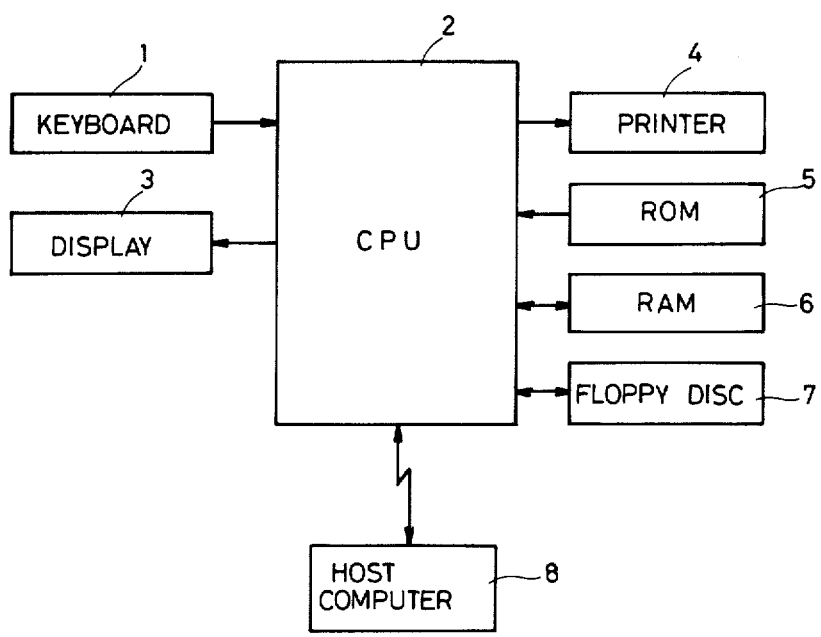
FIG. 2 is a schematic block diagram of the embodiment of the present invention.
Figures 3A, 3B, 3C:
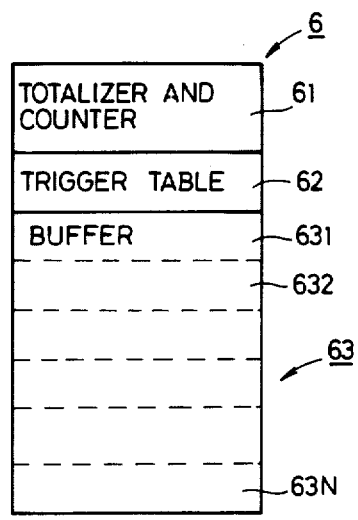
FIGS. 3A, 3B and 3C show data stored in a RAM as shown in FIG. 2.

FIG. 2 is a schematic block diagram showing an embodiment of the present invention. Description is now made on electric structure of the embodiment of the present invention with reference to FIG. 3. The keyboard 1 as shown in FIG. 1 is connected to a CPU 2, which is further connected with a display 3, a printer 4, a ROM 5, a RAM 6, a floppy disc 7 and a host computer 8. The display 3 is adapted to display inputted transaction data and the total amount thereof etc. and the printer 4 is adapted to print the data on receipts. The ROM 5 previously stores programs required for the operation of the CPU 2. The RAM 6 includes areas for storing data as shown in FIGS. 3A to 3C as hereinafter described. The floppy disc 7 and host computer 8 are employed as external storages to store transaction data for capturing operations.

FIGS. 3A to 3C show the data stored in the RAM 6 as shown in FIG. 2. The RAM 6 includes an area 61 as a totalizer and counter, a trigger table 62 and a buffer area 63 as shown in FIG. 3A.

The trigger table 62 includes an area 621 for storing function codes corresponding to the PLU function and A and B cards respectively and an area 622 for storing function numbers, as shown in FIG. 3B. In order to perform PLU registration, for example, "1234" is inputted by the ten keys 12 to operate the PLU key 141, whereby the function code area 621 stores "06" which is previously set in correspondence to the PLU function and the function number area 622 stores "1234". Further, when a customer submits an A card for a credit card transaction, the function code area 621 stores a code "22" previously set in correspondence to the A card and the function number area 622 stores, e.g., "01" as the function number.

The buffer area 63 includes, for example, a plurality of areas 631 to 63N, respective ones of which include areas for storing flags, department codes, class codes and the like as shown in FIG. 3C.

Figure 4:
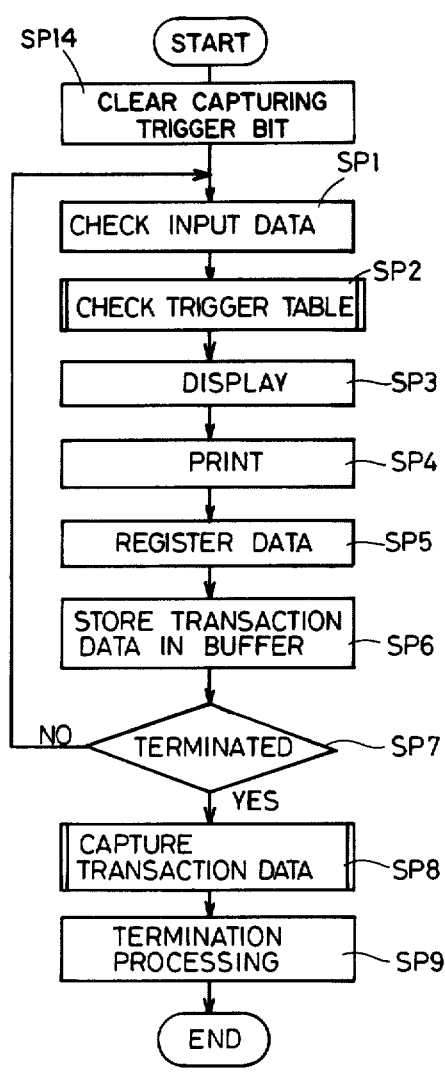
FIG. 4 is a flow chart for illustrating the definite operation of the embodiment of the present invention.
Figure 6:
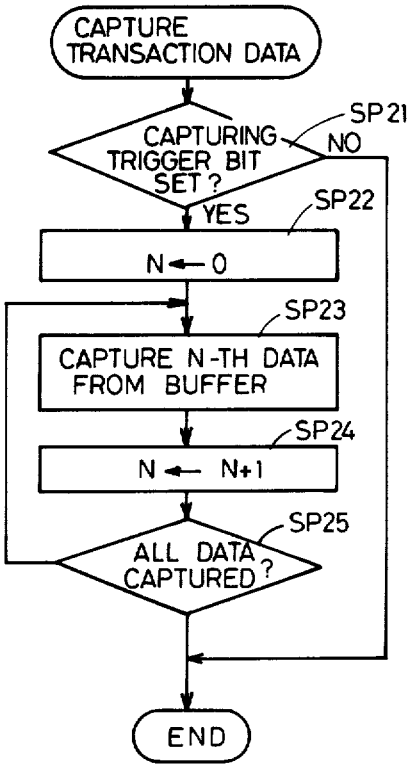
FIG. 6 is a flow chart for illustrating the process for capturing transaction data.
Figure 5:
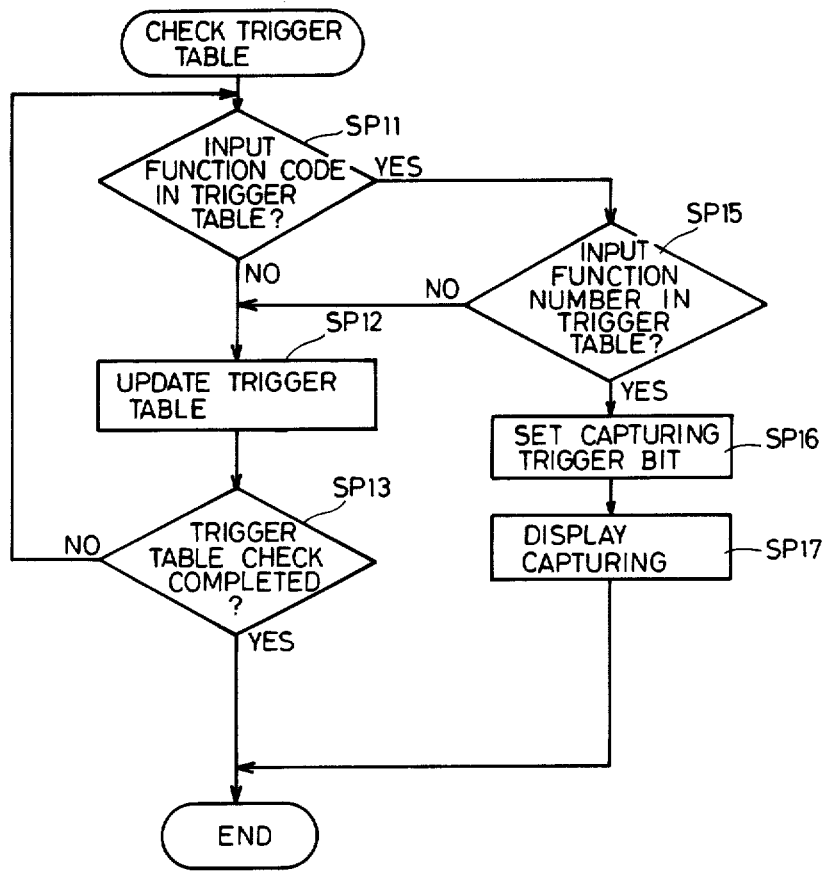
FIG. 5 is a flow chart for illustrating a trigger table checking operation.

FIG. 4 is a flow chart for illustrating the definite operation of the present embodiment and FIG. 5 is a flow chart for illustrating a trigger table checking operation while FIG. 6 is a flow chart for illustrating transaction data capturing processing.

The definite operation of the embodiment of the present invention is now described with reference to FIGS. 1 to 6.

An operator inputs price data on commodities purchased by a customer, to operate the department keys 13 for inputting the department codes. In accordance with signals inputted through the keyboard 1, the CPU 2 sets the function code and function number in response to any of the PLU department key 13, A key 143 and B key 144 along a key search program, thereby to advance to the program as shown in FIG. 1.

The CPU2 clears the capturing trigger bit in step SP0. Then the CPU 2 checks the input data at a step SP1, to check the trigger table 62 at a step SP2.

In other words, the CPU 2 advances to a program based on the flow chart as shown in FIG. 5. Then the CPU 2 determines at a step SP11 whether or not an input function code is in the trigger table 62, and if the determination is no, the CPU 2 updates the trigger table 62 at a step SP12 thereby to determine whether or not the whole trigger table 62 is checked at a step SP13. If the input function code is in the trigger table 62, the CPU 2 determines at a step SP15 whether or not an input function number is in the trigger table 62. If the input function number is in the trigger table 62, the CPU 2 sets a capturing trigger bit at a step SP16. The capturing trigger bit is set in a working area (not shown) of the RAM 6. Then the CPU 2 turns on a display (not shown) for indicating the capturing operation at a step SP17, thereby to return to the main routine as shown in FIG. 1 again.

At a step SP3, the CPU 2 displays the inputted data on the display 3, and at step SP4 prints the data on a receipt by the printer 4. At a step SP5, the CPU 2 registers the inputted data in the totalizer and counter area 61 of the RAM 6. At a step SP6, further, the CPU 2 stores the inputted data in the buffer area 631. The operator sequentially inputs the data on the commodities purchased by the customer, whereby the CPU 2 repeats the aforementioned sequential operation.

The operator registers all of the data on the commodities purchased by the customer, to operate the A key 143 included in the calculation keys 14 when the customer submits the A card as the credit card. The CPU 2 determines at a step SP7 whether or not all of the data on the commodities are completely inputted, and if the determination is yes, the CPU 2 performs at a step SP8 processing for capturing the transaction data in response to the operation of the A key 143.

Namely, as shown in FIG. 6, the CPU 2 determines whether or not the capturing trigger bit is set at a step SP21. If no capturing trigger bit is set, the transaction data are not captured and the CPU 2 performs processing for termination of the sequential operation. On the other hand, if the capturing trigger bit is set, the CPU 2 sets the counter value at a counter (not shown) for sequentially specifying the buffers 631 to 63N as shown in FIG. 3A at zero. Then, at a step SP23, the CPU 2 makes the floppy disc 7 store the data in the buffer area 631 specified by the said counter and transmit the same to the host computer 8. Further, the CPU 2 increases the counter value in the counter by one at a step SP24, and sequentially compares the said counter value of the counter with the buffer areas 631 to 63N to determine whether or not all of the data are captured at a step SP25. If the capturing operation is not terminated, the CPU 2 captures the data of the buffer area 632 specified by the counter. The CPU 2 repeats such operation to store the data stored in the buffer area 63 in the floppy disc 7 while transferring the same to the host computer 8, thereby to perform termination processing at a step SP9 upon termination of all processing.

According to the present invention as hereinabove described, the data registered only when the A key 143 or B key 144 is operated are stored in the floppy disc 7 and transferred to the host computer 8, and hence the registered data can be stored in the external storages by simply operating the A key 143 or B key 144 only when it is necessary to register the data in the external storages.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic cash register which can register in external storages only desired data from the data on registered commodities, comprising:

input means for inputting data on commodities purchased by a customer;

storage means for storing said data on commodities inputtted from said input means;

external registration commanding means for generating a command for external registration of said data when said data is to be registered in said external storage;

bit storing means responsive to said command from said external registration commanding means for storing a bit indicating that said data inputted from said input means is to be registered in said external storages;

settlement command means for providing a settlement command of transaction when all of said data on commodities purchased by a customer has been completely inputted by said input means; and control means for controlling said data storage means such that each time said data on commodities is inputted by said input means, the inputted data is stored in said data storage means, for controlling said bit storage means such that said bit indicating that the external registration of said data is to be made is stored in said bit storage means in response to said command from said external registration commanding means, and for determining, in response to the command from said settlement command means, whether said bit indicating that external registration is to be made is stored in said bit storage means, and registering in said external storages a part or all of said data stored in said data storage means, if and when it is determined that said bit indicating that external registration of said data is to be made is stored in said bit storage means.

2. An electronic cash register as claimed in claim 1, wherein there are a plurality of said external registration commanding means, each having a corresponding identification code.

3. An electronic cash register as claimed in claim 2, further comprising identification code storage means for storing said identification codes of said plurality of external registration commanding means.

4. An electronic cash register as claimed in claim 3, wherein said control means includes means responsive to a command from any of said plurality of external registration commanding means for determining whether said identification code corresponding to the external registration commanding means is stored in said identification code storing means and, if said identification code is stored therein, controlling said bit storing means such that said bit indicating that external registration is to be made is stored in said bit storage means.

5. An apparatus capable of storing in external storages only selected data from registered commodities data, said apparatus comprising:
   (a) input means for entering said commodities data;
   (b) storage means for storing said commodities data received through said input means;
   (c) indicator means for selectively indicating which of said commodities data is to be stored in said external storages including bit storing means for storing a bit indicating that said commodities data entered from said input means is to be registered in said external storages;
   (d) command means for providing a command signal when all of said commodities data purchased by a customer has been completely entered through said input means; and
   (e) control means responsive to said command signal from said command means for determining whether the bit indicating said commodities data is to be registered in said external storage is stored in said storage means and transferring said commodities data indicated by said indicator means to said external storage, when said control means determines said bit is stored in said storage means.

6. An apparatus capable of storing in external storages only selected data from registered commodities data, said apparatus comprising:
   (a) input means for entering said commodities data;
   (b) storage means for storing said commodities data received through said input means;
   (c) indicator means for selectively indicating which of said commodities data is to be stored in said external storages;
   (d) command means for providing a command signal when all of said commodities data purchased by a customer has been completely entered through said input means; and
   (e) control means responsive to said command signal from said command means for transferring said commodities data indicated by said indicator means to said external storages, wherein said indicator means includes a bit storage means in which a trigger bit is set when said commodities data is to be stored in said external storages.

7. An apparatus as claimed in claim 6 wherein said control means determines whether said trigger bit is set in said bit storage means in order to transfer said commodities data to said external storages.

8. A method of operating an electronic cash register capable of storing in external storages only selected data from registered commodities data, said method comprising the steps of:
   entering said commodities data through an input means;
   storing said commodities data entered in a storage means;
   indicating which of said commodities data is to be stored in an external storage by storing an indicator bit in a bit storage means indicative that said commodities data entered with said input means is to be stored in said external storage;
   generating a command signal when all said commodities data for commodities purchased by a customer has been completely entered;
   determining whether said indicator bit is stored in said bit storage means and transferring said commodities data indicated by the indicator bit to said external storages when said indicator bit is stored in said bit storage means.

* * * * *